United States Patent
Solimano

(10) Patent No.: US 8,434,071 B2
(45) Date of Patent: *Apr. 30, 2013

(54) METHOD FOR TRANSLATING A GRAPHICAL WORKFLOW IN A TEXTUAL DESCRIPTION

(75) Inventor: Marco Solimano, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 1293 days.

This patent is subject to a terminal disclaimer.

(21) Appl. No.: 12/214,916

(22) Filed: Jun. 24, 2008

(65) Prior Publication Data

US 2009/0070749 A1    Mar. 12, 2009

(30) Foreign Application Priority Data

Sep. 11, 2007  (EP) ..................................... 07017737

(51) Int. Cl.
*G06F 9/44* (2006.01)

(52) U.S. Cl.
USPC .......................................... 717/137; 717/153

(58) Field of Classification Search ........... 717/136–161
See application file for complete search history.

(56) References Cited

U.S. PATENT DOCUMENTS

| | | | |
|---|---|---|---|
| 5,187,788 A | | 2/1993 | Marmelstein |
| 5,721,912 A | * | 2/1998 | Stepczyk et al. ...................... 1/1 |
| 5,768,564 A | * | 6/1998 | Andrews et al. ............... 717/137 |
| 7,631,291 B2 | * | 12/2009 | Shukla et al. .................. 717/107 |
| 2003/0005406 A1 | * | 1/2003 | Lin et al. ........................ 717/102 |
| 2005/0131672 A1 | | 6/2005 | Dalal et al. |
| 2006/0130007 A1 | * | 6/2006 | Ackerman .................... 717/136 |
| 2006/0212845 A1 | | 9/2006 | Davidson et al. |
| 2007/0050185 A1 | | 3/2007 | Manson et al. |

OTHER PUBLICATIONS

Kacmara et al., Providing workflow services using a programmable hypermedia environment, vol. 40, Issue 7, Aug. 10, 1998; pp. 1-21.*
W.M.P. Van Der Aalst et al., Workflow Patterns, 2003 Kluwer Academic Publishers, pp. 6-51.*
T. Foster et al., Using Translation Technology at Sun Microsystems, 2004—wikis.sun.com, pp. 1.*
Bournai et al.: "Un Environnement Graphique Pour Le Langue Signal"; Rapports de Recherche—Le Chesnay, France; No. 2040; 1993; pp. 1-41, ISSN: 0249-6399.

* cited by examiner

*Primary Examiner* — Wei Zhen
*Assistant Examiner* — Satish Rampuria
(74) *Attorney, Agent, or Firm* — Laurence A. Greenberg; Werner H. Stemer; Ralph E. Locher

(57) ABSTRACT

In a method for translating a graphical workflow in a textual description, a structure of the graphical workflow is analyzed by detecting graphical blocks of the graphical workflow. Further, each graphical block of the graphical workflow is translated in a textual description.

6 Claims, 3 Drawing Sheets level 1:

Structural analyser

- It paces the graphical workflow and identifies syntactical constructs
- Calls the lower level for each block found level 2:

Single blocks translator

- According to the type of the specific block and its connections, it establishes the textual description of the block itself.

- In case of complex expressions or, in general, whenever a parsing of block configuration is needed, it calls the lower level level 3:

Expression parser

- This level knows the translation rules between source and target language and applies them to get a textual description of the source language

Fig. 3

METHOD FOR TRANSLATING A GRAPHICAL WORKFLOW IN A TEXTUAL DESCRIPTION

BACKGROUND OF THE INVENTION

The invention relates to a method for translating a graphical workflow in a textual description.

In the world of process automation and process monitoring standard automation systems for controlling the widest conceivable variety of machines and plants are state of the art. Such technology covers in particular a broad range of products which are offered by the Siemens Corp. under its SIMATIC® product family within the field of manufacturing execution systems (MES). An extensive line of products for solving the technical tasks in question such as counting, measuring, positioning, motion control, closed-loop control and cam control enhance the performance capabilities of appropriate process controllers. A variety of configurations enable the implementation of flexible machine concepts.

In this context a broad range of IT solutions exist to connect the actual hardware close to the technical and/or logistical process to the application layer of the client driving the installation. Manufacturing execution systems have therefore been developed to meet all of the requirements of a service oriented architecture (SOA) to integrate seamless into a totally integrated automation (TLA). A plug & play architecture, in which the individual functions can be easily combined and configured with each other thereby forms the basis for this success thereby simplifying the complex structures of controlling a manufacturing plant or the like.

These demands very often require in the backbone rather complicated and sophisticated software solutions which enable the approach of totally integrated automation. In view of this, the software engineers very often use production moduler to define the plant model and its standard operating procedures and create the respective new software by means of a high level graphical language which identifies the workflow of activities within the software. Subsequently, this string/term of high level graphical language is translated into a client based software language executable on the machine language level. This translation requires tremendous efforts in programming and need serious testing to check whether the translated program behaves the same as the original string/term of the high level graphical language.

For modeling the production system it is required to divide the productive process in many steps (hereinafter called product segments) so that each of the product segments represents a simple action that can be controlled by the MES system. This subdivision must take care of all dependencies existing between the product segments in order to guarantee that the entire production will be executed in the correct way. In this context, graphical programming has become more and more popular in the last years, due to its ease of use and clarity. As a result, many programming tools are based on this graphical approach. Graphical programming usually follows proprietary rules that very often do not require to build structured workflows. An example is a production modeler within a manufacturing execution system which assists to generate a virtual workflow of the production process.

In recent years, the standardization of process languages and their graphical programming is emerging. Such process languages are structured. For example BPEL (Business Processes Execution Language) is a structured language for the workflow code. Further information about the BPEL standard can be found on the web site http://www-106.ibm.com/developerworks/webservices/library/ws-bpel/. Another example is the ANSI/ISA/95 standard which has been released in order to standardize graphical language and its programming within manufacturing execution systems.

SUMMARY OF THE INVENTION

Till now, no method is known which allows in a standard and general way to translate the graphical language into BPEL. Also, a textual documentation of graphically expressed logics is difficult. Hence, it is also difficult to produce reports of graphically expressed applications. It is therefore an object of the present invention to provide a method for translating a graphical workflow in a textual description.

Accordingly, one aspect involves a method for translating a graphical workflow in a textual description, in which a structure of the graphical workflow is analyzed by detecting graphical blocks of the graphical workflow. Further, each graphical block of the graphical workflow is translated in a textual description.

For analyzing the structure of the graphical workflow it is helpful to detect initial blocks, conditional blocks and action blocks of the graphical workflow.

For translating the graphical blocks, it is helpful to translate the initial block in a first string, to translate the conditional block in a second string, and to translate the action block in a third string.

Furthermore, for translating the graphical blocks it can be helpful to consider the connections between the graphical blocks.

According to one aspect of the invention the textual description is translated in a target language.

For translating the textual description in the target language, it is helpful to use expressions in the graphical blocks.

For translating the textual description in the target language, it can be furthermore helpful to use the comments added by a user to the graphical blocks.

Advantageously the method according to the invention can be used for producing a textual description of the graphical workflow.

The method according to the invention can also be used for producing run time explanations of the actions.

Furthermore, a computer program element can be provided, comprising computer program code for performing steps according to the above mentioned method when loaded in a digital processor of a computing device.

Additionally, a computer program product stored on a computer usable medium can be provided, comprising computer readable program code for causing a computing device to perform the mentioned method.

BRIEF DESCRIPTION OF THE SEVERAL VIEWS OF THE DRAWINGS

The novel features and method steps characteristic of the invention are set out in the claims below. The invention itself, however, as well as other features and advantages thereof, are best understood by reference to the detailed description, which follows, when read in conjunction with the accompanying drawings, wherein:

FIG. 3 shows how the translation of the graphical blocks is executed.

DETAILED DESCRIPTION OF THE INVENTION

The proposed translation method includes a generic translator, a set of specific translators, and a final main compiler.

The generic translator takes as input a high level graphically expressed language and produces as output a structured set of instructions. The set of specific translators take as input an instruction and translates it into a given language, that can be BPEL, another structured language, or even an "adapted" natural language. The final main compiler combines the knowledge about the graphical workflow structure (set of instructions) and the peculiar translation chosen to produce as output the same sequence of instructions, expressed in a target language.

If the output language, which is hereinafter also called target language, is a natural one, it can be used for at least a couple of purposes: To produce an automatic documentation of the workflow, or to give run time explanations of actions done.

The proposed translation method can be used using almost any input program language, even if it will be applied for Production Modeler language only, in a first step.

The method according to the invention can produce almost infinite kind of output languages, from programming to descriptive ones.

The usage herein proposed allows graphically based tools to produce better documentation of work done by engineers, as well as automatic explanations of actions to end users.

This characteristics will reduce work and effort needed for releasing an application, eliminating the need for the engineer to spend lot of time in "low level" activities, such as writing textual description of application behavior. In addition, produced documentation is for sure accurate, being automatically built according to the logic inserted, and the risk of mistakes or inaccuracy of description is reduced.

Figure 1:
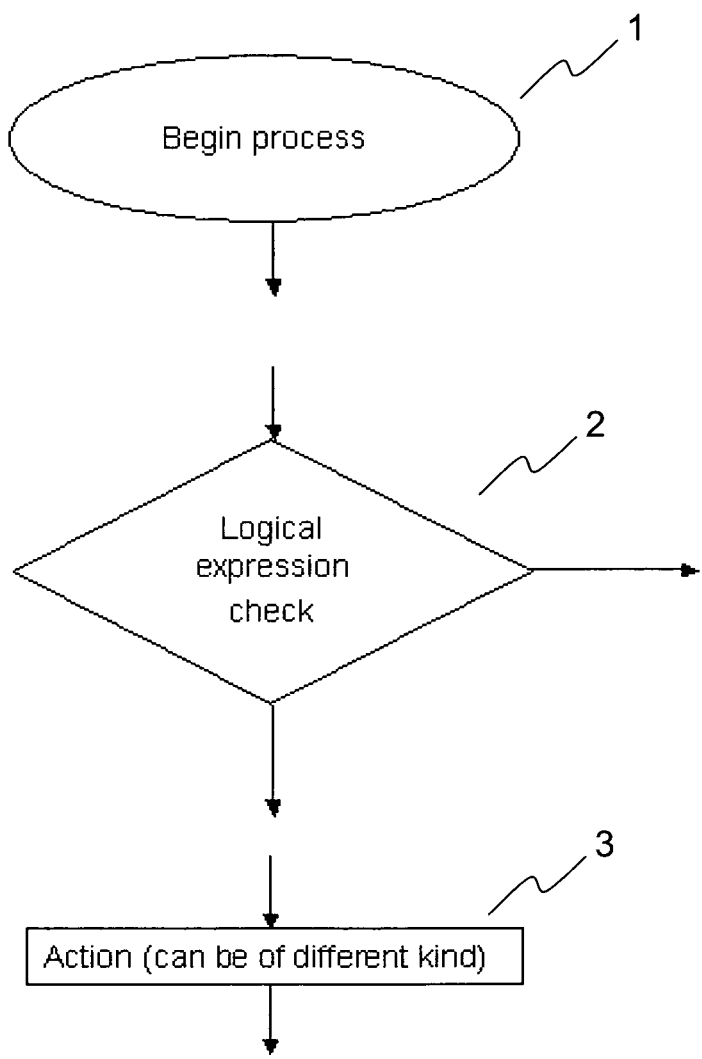
FIG. 1 shows different graphical blocks.
Figure 2:
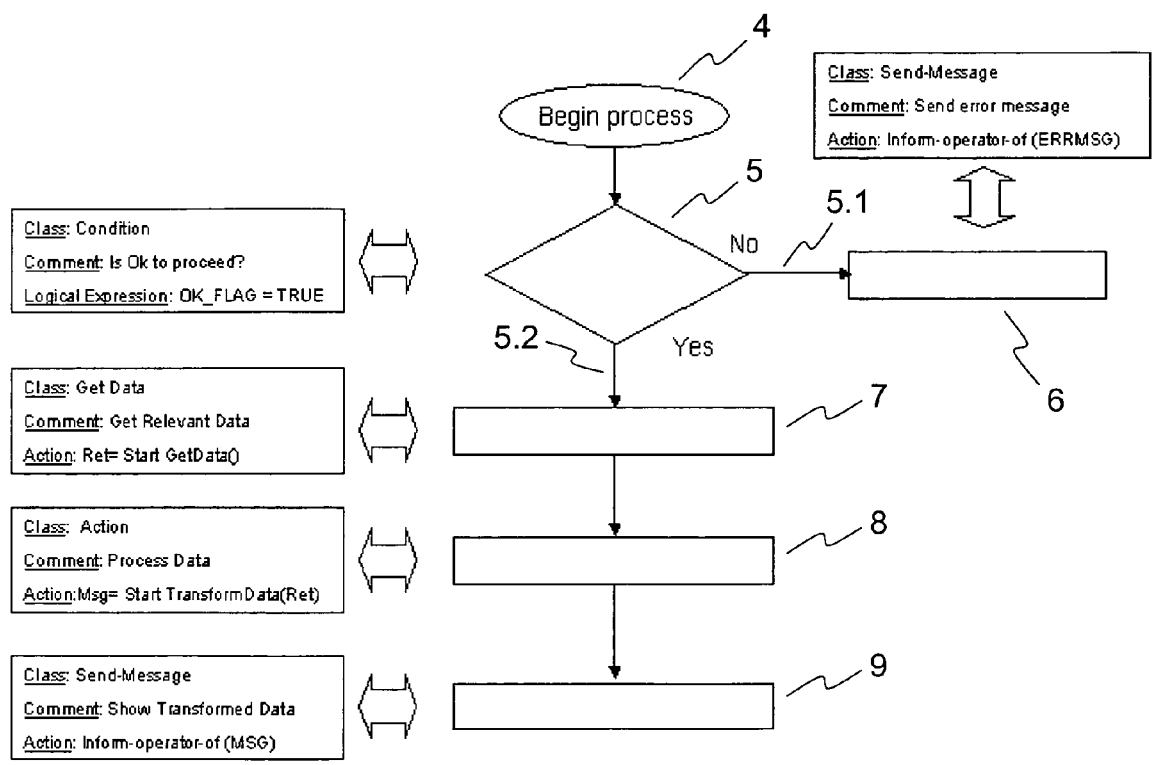
FIG. 2 shows an example of a flowchart comprising the graphical blocks.

In the following, it is described the information available for the translation method. The starting point is a graphical workflow, describing a process that can be either logical or physical. An example of such a graphical workflow is a flowchart as shown in FIGS. 1 and 2. The graphical workflow can comprise three main graphical blocks 1, 2, 3 which can be described in an object oriented way by means of three main classes of objects and a class of connections. One object and at least one connection are part of a graphical block.

Three main graphical blocks, called begin block 1, condition block 2, and action block 3 are shown in FIG. 1. The begin block 1 is characterized by having only one output connection. The condition block 2 has at least one input connection and two output connections, where one of the two output connections represents a "false" state and the other one a "true" state of a logical expression. Finally, the action block 3 has at least an input connection and an output connection.

Each graphical block 1, 2 or 3 can be connected to more than one further graphical block 1, 2, 3. In this case, these further graphical blocks are meant to be in parallel. For example, in FIG. 2 the graphical block 5 is connected to the graphical blocks 6 and 7.

Each graphical block 1 to 9 comprises a kind or the class to which the block belongs. For example block 4 belongs to the class begin, while block 5 belongs to the class condition. Furthermore, each graphical block 1 to 9 comprises a comment, which can be a string freely insertable by the programmer (and, actually, optional). Each graphical block 1 to 9 also comprises an ID (identification code), which is unique inside the workflow, and that identifies the graphical block itself. The ID can be substituted by any other reference way, like a pointer, without changing the global structure. Each graphical block 1 to 9 comprises also a set of attributes, depending from the kind of block, which completely describes the object's behavior. For example, a condition characterized by an attribute "logical expression" where the logical expression to be checked is defined.

The graphical blocks 1 to 9 can be nested in a complex hierarchy. For example, action blocks can be of different classes, according to the different types of actions that can be defined. For example the action block 6 belongs to the class Send-Message, while the action block 7 belongs to the class Get Data.

The graphical blocks 4 to 9 of the flowchart shown in FIG. 2 belong to one of the above mentioned classes, and they are connected to some other graphical blocks.

The proposed method comprises an "n-tier translation"; in fact, the translation method comprises at least three levels or phases, which are described hereinafter.

Level 1: On level 1, a structural analyzer is provided to analyze and identify structural constructs inside the graphical workflow. To do that, the structural analyzer scans the workflow with a recursive procedure, which calls the translation method for the individual graphical block found, and applies itself on the steps connected to the output.

There is a separation between the overall compilation procedure, which is generic and that deals with the workflow structure, and the individual translation of each block, represented by next level.

Level 2: On level 2, a single blocks translator is provided. The single blocks translator establishes the actual conversion of a block typology into a target language. Level 2 can be defined in a general and flexible way, so that it is possible to change the target language. The target language can be, for example, German or English or even a programming language like C#. To define in flexible way, it may be needed to define more than one "single block translator" for each class of object, according to the different possible translations.

The single blocks translator may take advantage from comments inserted by the user. Clearly, such comments are outside the control of the single blocks translator and thus can only be used as they are. The utility of those comments is that of allowing the needed personalization of the auto-generated description.

Level 3: On level 3, an expression parser is set aside. Level 3 is the last and innermost level and is devoted to detect and parse the attributes characterizing each object behavior. To this category belongs for example the logical expression specified in the condition OK_FLAG=TRUE. The purpose of the expression parser is to build details of the translation according to what the user has really defined as the object behavior. In this case, it can be helpful to detect possible discrepancies between what the user has designed as the actual behavior of the object and what has been the description of it. Additionally, the description inserted by the user can be used to support the expression parser to detect the behavior of the object or graphical block. The user can balance these two aspects of the translation according to his needs.

The insertion of level 3 as optional, anyway, has several advantages:
  It does not have to be very sophisticated, for a couple of good reasons:
    The starting language, being a programming language, is very precise, highly reducing the occurrence of uncertain constructs or constructs whose meaning depends from the context.
    Even in the unlikely situation in which the meaning of a syntactical construct depends from the context, this is solved by the above levels.

It can be tailored to give translation in multiple languages, limiting the impact of different target languages to the entire translation process.

It can be developed using an incremental approach, e.g. the first version of the translator can have a rough specific translation, and leverage only to user-inserted descriptions.

Level 1, level 2 and level 3 cooperate in giving as a final result an auto generated verbose description of a graphical workflow or flowchart, which can be used to automatically produce a project documentation. The verbose description is perceived and treated as a particular translation from one language to another. The user can, of course, deeply interact with the translator, both for configuring description format and for filling a user-friendly description.

In FIG. 3 level 1, level 2 and level 3 of the method for translating a graphical workflow into a textual description is depicted.

In the following it is explained how the flowchart depicted in FIG. 2 is treated by the translator to transform the graphical flowchart into a textual description.

Level or Phase 1: Structural Analysis

At level 1 the structure of the graphical flowchart of FIG. 2 is paced. Thereby, the following structure is detected:

An initial block (also called begin block) 4

A conditional block 5 with a false path 5.1 and a true path 5.2:
   False: A sequence of the following blocks:
      Send-message action 6
   True: A sequence of the following blocks:
      Get-data action 7
      Generic action 8
      Send-message action 9

The format in which data are represented is not so important, because it is not saved; instead, the format resides in memory, available to be processed in level or phase 2.

Level or Phase 2: Single Block Translation

By means of the single blocks translator, which is also called individual translators, each graphical block found in phase 1, is translated. The translation depends on the kind of object or block encountered. This means for the example depicted in FIG. 2:

The begin block 4 is translated by the string "Begin:" regardless of its details.

T1: The condition block 5 is translated in the string "If <details> then".

T2: If more than one object is connected to the true path 5.2, the string "In parallel" is added.

T3: The single blocks translator is applied recursively to each object 7, 8,9 connected to the true path 5.2.

T4: If more than one object has been found for each branch, the string "In order:" is added.

T5: If no object is connected to false path 5.1 the procedure returns, otherwise T6: The string "else" is added.

T7: The steps T2, T3 and T4 for the object 6 connected to false path 5.1 are repeated.

The send-message action 6 produces the string "Send <details> to the operator, without waiting for acknowledge".

The result of the translation on level 2 is:

Begin:
If <details> then
In order:
<get data detail>
<generic details>
<send message details>
else
<send-message details>
finish The words depicted in italic are those decided by the translator observing the kind of objects or blocks and their connections in level 1, whereas the words depicted in < > are determined by level 2.

Again, it should be noted that the level 2 output listed above is an example. The actual output can be different, without affecting the overall method. For example, the user can find it desirable to have listed a number associated to each action for further or deeper reference. In that case, the output can become similar to the following:

| | |
|---|---|
| 1 | Begin: |
| 2 | If <details> then |
| | In order: |
| 3 | <get data detail> |
| 4 | <generic details> |
| 5 | <send message details> |
| | else |
| 6 | <send-message details> |
| 8 | finish |

This decoupling of the single blocks translator from level 1 allows defining different translations, either to cover more source languages or to translate the graphical blocks 1 to 9 in different target languages, without modifying the overall method. This allows it to use the method as a configurable tool, which does not require recompilation to work with different user preferences.

Finally, if this method is extended to the expression parser described below, it becomes possible to translate the graphical blocks or objects and even the low level details in different languages.

Level or Phase 3: Expression Parsing and Enrichment of Single Translation

At level 3, as said before, the expression parsing and enrichment of single translation can produce various translations, depending on the expression parser capabilities and the use of comments inserted by user.

It is also possible to combine the knowledge gained from the expression parsing and from the comments to have more details, according to the purpose of the translations. For example, it may be desirable having a more generic high-level description in presenting the process to operators, while it is needed to have more details, and mainly the assurance to have them representing exactly what has been developed, in case of an automatic documentation of the software for commercial purposes (like acceptances by customers).

The parsing of the expressions may depend on the type of object containing the expression. For example, the same expression syntax can be translated in different ways, if the expression is contained in a condition block or in an action block.

For example the word "=" is translated:
   as "is equal to" in an expression contained inside a condition block, or
   as "and put the results to" in an expression contained inside an action block.

In general, an expression contained inside an action block is translated in a richer way.

Another example is the signature of a function:

If f is a function and (arg1[, arg2] ... ) its arguments, the open parenthesis can be expressed in a richer way than the same syntax inside an expression of a logical check, substituting it with the word "on", and removing the closed parenthesis.

EXAMPLE

Start FUNC(Arg1) becomes "START FUNC on Arg1"

Regarding the possibility to mix parsing results and user-inserted comments, a simple yet general enough way to combine results is to format the string as:

<UserComment> (i.e.: <parser results>)

It is noted, that the actual translation can vary without disturbing the overall process.

In the following three examples are explained: In example 1 only user inserted comments are used. In example 2 an expression parsing is leveraged, and in example 3 the examples 1 and 2 are combined.

Example 1

Parsing of Expressions

The result is:

```
Begin:
If OK_FLAG is equal to TRUE then
In order:
Start GetData and put the results to Ret
Start TransformData on Ret and put the results to Msg
Send Msg to the operator, without waiting for acknowledge
else
Send ERRMSG to the operator, without waiting for acknowledge
finish
```

Example 2

Applying User-Inserted Descriptions

The result is:

```
Begin:
If is Ok to proceed then
In order:
Get relevant data
Process data
Show transformed data
else
Send error message
finish
```

Example 3

Combining the Knowledge Gained in Examples 1 and 2

The result is:

```
Begin:
If is Ok to proceed (i.e.: OK_FLAG is equal to TRUE) then
In order:
Get relevant data (i.e.: Start GetData and put the results to Ret)
Process data (i.e.: Start TransformData on Ret and put the results to Msg)
Show transformed data (i.e.: Send Msg to the operator, without waiting for acknowledge)
else
Send error message (i.e.: Send ERRMSG to the operator, without waiting for acknowledge)
finish
```

In a further example, the same principle is applied to translate the workflow in another natural language, e.g. Italian. User comments are not translated and so the case considered here is that of using only the expression parser. On the contrary, both individual translators and expression parsers are localized into Italian.

The above described example 1 becomes in Italian after applying the individual translators (level 2):

Any begin block is translated by the string-"Inizio:", regardless its details.

Any condition block does the following:
T1: Produces the string "Se <details> allora"
T2: If more than one object is connected to the true path 5.2, adding the string "In parallelo"
T3: Applying recursively the blocks translator to each object 7, 8 and 9 connected to the true path 5.2
T4: If more than one object has been found for each branch, adding the string "In sequenza:"
T5: If no object is connected to false path 5.1 the procedure returns, otherwise
T6: Adding the string "altrimenti"
T7: Applying the steps T2, T3 and T4 for object 6 connected to false path 5.1.

Any send-message action produces the string: "Manda <details> all'operatore, senza aspettare risposta".

The above described example 2 becomes in Italian after applying the expression parser (level 3):

The word "=" can be translated as

"è uguale a" in expressions contained inside conditions, or
"e salva il risultato in" in expressions contained inside actions Functions' signatures are replaced by the word "su"

The result is:

```
Inizio:
Se OK_FLAG è uguale a TRUE allora
In sequenza:
Lancia GetData e salva il risultato in Ret
Lancia TransformData su Ret e salva il risultato in Msg
Manda Msg all'operatore, senza aspettare risposta
Altrimenti
Manda ERRMSG all'operatore, senza aspettare risposta
Fine
```

As shown, simply changing some individual translation rules one can obtain, without additional efforts, a complete and reasonable translation in any natural language.

Having illustrated and described a preferred embodiment for a novel method for client server synchronization of data across a communication network, it is noted that variations and modifications in the method can be made without departing from the spirit of the invention or the scope of the appended claims.

What is claimed is:

1. A method performed by computer program code executed by a computing device, the method for translating a graphical workflow in a textual description, comprising:

analyzing, with the computing device, a structure of the graphical workflow by detecting graphical blocks of the graphical workflow;

translating each graphical block of the graphical workflow in a textual description; and translating the textual description into a target language, the target language being one of a natural language or a compiled binary language;

wherein the natural language is used to produce an automatic documentation of the graphical workflow, or to give run time explanations of actions done.

2. The method of claim 1, wherein for analyzing the structure of the graphical workflow initial blocks, conditional blocks and action blocks of the graphical workflow are detected.

3. The method of claim 2, wherein for translating the graphical blocks the initial block is translated in a first string, the conditional block is translated in a second string, and the action block is translated in a third string.

4. The method of claim 3, wherein for translating the graphical blocks the connections between the graphical blocks is considered.

5. The method of claim 1, wherein for translating the textual description in the target language, the expressions in the graphical blocks are used.

6. The method of claim 1, wherein for translating the textual description in the target language, the comments added by a user to the graphical blocks are used.

* * * * *